United States Patent [19]

Carr et al.

[11] Patent Number: 5,486,043
[45] Date of Patent: Jan. 23, 1996

[54] CARRYING CASE HAVING DETACHABLE STEP STOOL

[75] Inventors: Arthur G. Carr, Washington, D.C.; Christopher A. Durgin, Springfield, Va.; William D. Griffiths, Annandale, Va.; J. Alexander Hill, Alexandria, Va.

[73] Assignee: Nomadic Structures, Inc., Springfield, Va.

[21] Appl. No.: 198,775

[22] Filed: Feb. 18, 1994

[51] Int. Cl.[6] .................................................. A47B 81/00
[52] U.S. Cl. ..................................... 312/235.1; 312/249.8
[58] Field of Search ............................. 312/235.1, 249.8, 312/293.3

[56] References Cited

U.S. PATENT DOCUMENTS

| | | | |
|---|---|---|---|
| D. 324,948 | 3/1992 | Powers et al. . | |
| D. 330,294 | 10/1992 | Carr . | |
| 570,199 | 10/1896 | Caplinger | 312/249.8 |
| 2,775,499 | 12/1956 | Gleitsman | 312/235.1 |
| 3,407,899 | 10/1968 | Delafrange | 312/235.1 |
| 4,512,097 | 4/1985 | Zeigler . | |
| 4,800,663 | 1/1989 | Zeigler . | |
| 4,941,717 | 7/1990 | Beaulieu . | |
| 4,970,841 | 11/1990 | Ziegler . | |
| 5,044,595 | 9/1991 | Carr et al. . | |

*Primary Examiner*—James R. Brittain
*Assistant Examiner*—Gerald A. Anderson
*Attorney, Agent, or Firm*—Burns, Doane, Swecker & Mathis

[57] ABSTRACT

A carrying case assembly includes a carrying case portion provided with a first interior cavity and a first top opening and a step stool portion provided with a second interior space and a bottom opening. The bottom of the step stool portion is attached to the top of the carrying case portion such that the first and the second interior space, together, form a third interior space. The step stool portion is removable from the carrying case portion and is adapted to support a person thereon.

23 Claims, 9 Drawing Sheets

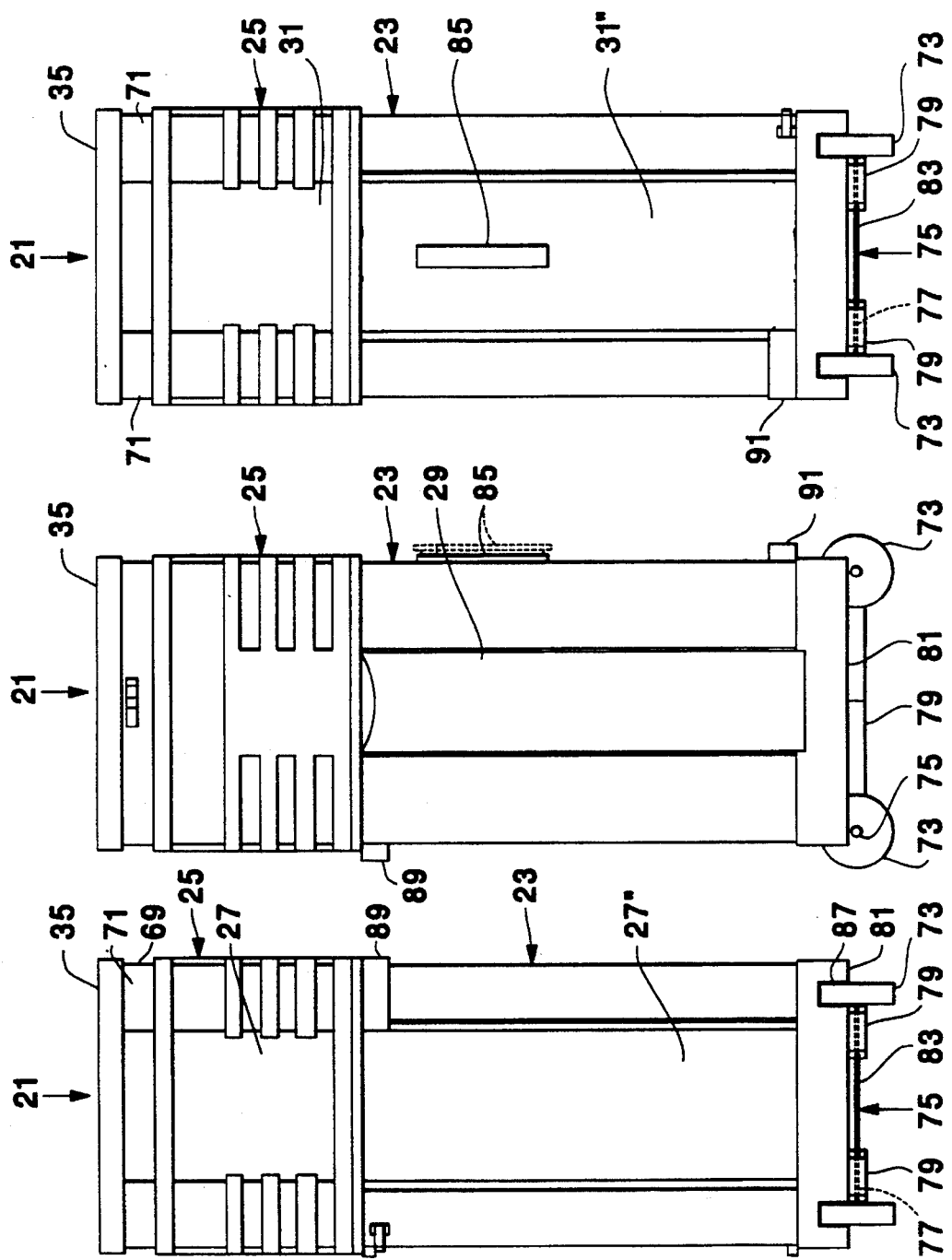

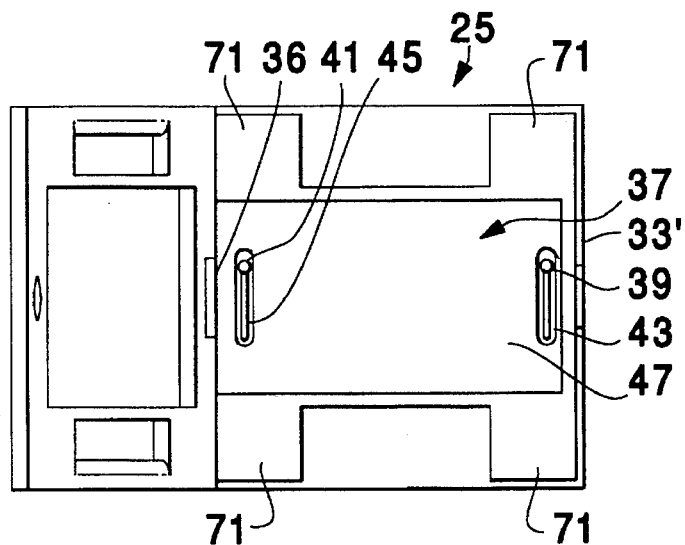
FIG. 7
FIG. 8
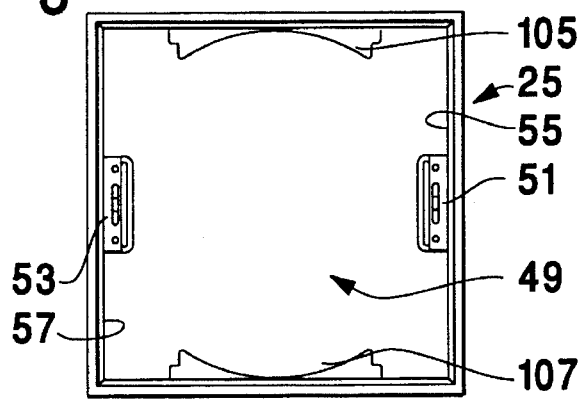
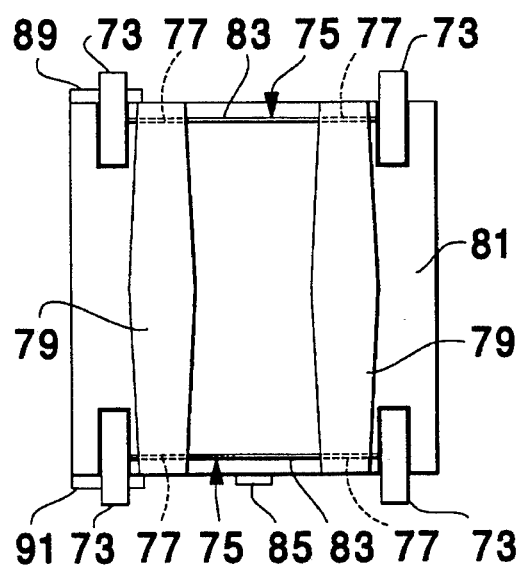
FIG. 10

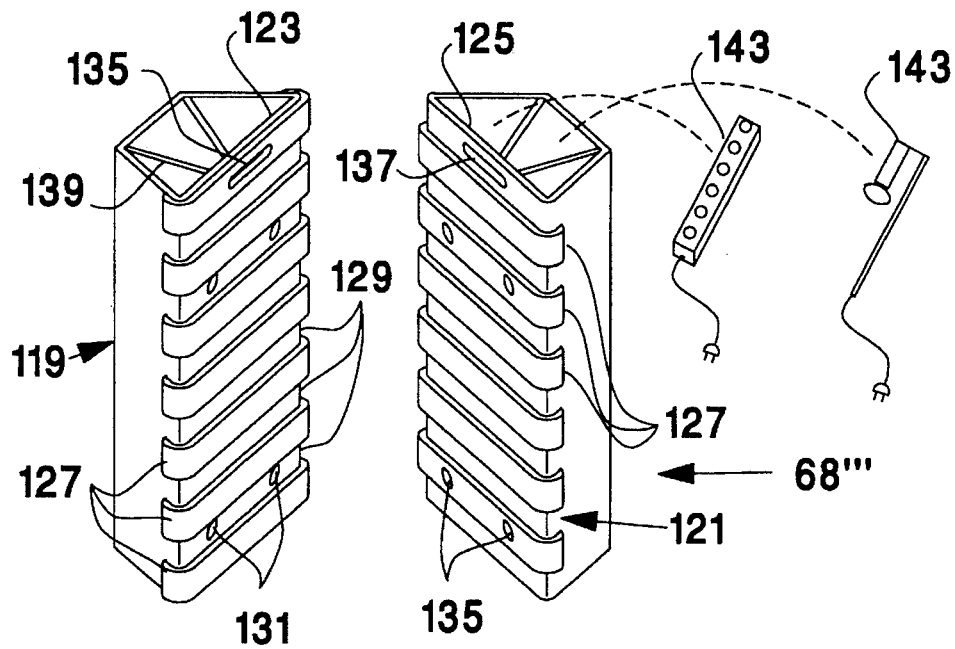
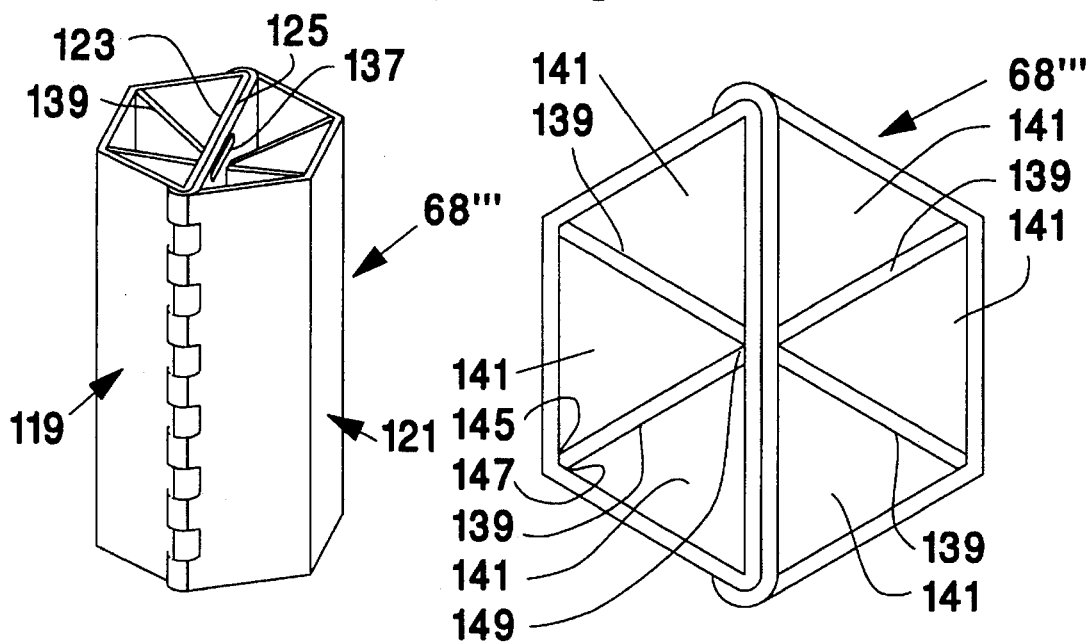
FIG. 14C
FIG. 14A
FIG. 14B 5,486,043

CARRYING CASE HAVING DETACHABLE STEP STOOL

BACKGROUND

The present invention relates to carrying cases and, more particularly, to carrying cases for components of a collapsible display.

Display wall arrangements are well known and are commonly used in situations such as conventions for the display of company advertising, etc. Because many functions during which such display wall arrangements are used are relatively short-lived, and because most of the locations in which such display wall arrangements are used are intended for many purposes, such as sporting events, conventions, concerts, etc., collapsible, movable, reusable display walls are a popular alternative to more expensive, less versatile permanent walls.

U.S. Pat. Nos. 4,512,097, 4,800,663, and 4,970,841, for example, teach collapsible display frameworks suitable for covering with fabric or graphic panels. The fabric, usually a carpet-like fabric, is removable from the framework and is rolled up, and the framework collapses and is able to be broken into several small bundles. The framework bundles and fabric rolls are relatively easy to transport and can be quickly erected when needed.

The framework bundles and fabric rolls, as well as other items desired for a particular display, are often shipped to their destinations. Frequently, to prevent damage to the rolls of fabric framework covers, such as crushing or tearing, the fabric parts of the displays are shipped separately from the framework. Collapsible displays are often shipped in special carrying cases, which are themselves well known.

Because certain popular shippers have maximum weight and size regulations for shipped articles, where the total weight of the framework and fabric bundles for a particular display exceeds the maximum weight regulations of the shipper, the framework and fabric bundles are shipped in two or more separate packages. In many instances, three packages, two for the framework bundles and one for the separately shipped fabric cover, are often necessary to ship a complete display, even where the total weight of the display is no greater than the maximum weight for two packages. It is, accordingly, desirable to provide a lightweight carrying case for shipping and easily moving a collapsible display in which both rolled fabric covers and framework bundles for forming the display are able to be safely shipped together.

Once a collapsible display has arrived at its destination, it is generally necessary to maneuver its components through congested aisles. While the displays are relatively light in weight, a small person may have difficulty in moving the components of the display to a particular location, particularly if moving multiple packages, each packed to its maximum weight limit, is involved. Accordingly, it is desirable to provide carrying cases facilitating maneuvering of components of a collapsible display wall.

While collapsible display walls are available in a range of sizes and shapes, the walls generally tend to be around eight feet high when erected. Accessories such as lighting and display graphics are often attached to the upper regions of the display walls. Attaching such accessories to the upper regions of the display walls can present difficulties, particularly for shorter persons. Generally, it is necessary for such persons to obtain a step ladder to safely attach the accessories. Step ladders will often not be readily available on the premises. However, shipping a separate step ladder with the collapsible display wall adds to expense. Further, once used, the step ladder is unnecessary and in the way. As a result, unsafe substitutes for a step ladder are often used, such as chairs, tables, etc., and accidents result. It is, accordingly, desirable to provide an inconspicuous means for safely facilitating access to upper regions of a collapsible display wall, shippable with the display wall, that does not add to shipping costs.

Packing and unpacking of the components of a collapsible display wall in a carrying case can be difficult for a smaller person. For example, where the carrying case has a top opening for receiving the roll of fabric cover, it may be difficult for a smaller person to lift the roll to a sufficient height to place the roll in the carrying case or remove the roll from the carrying case. It is, accordingly, desirable to provide a carrying case that permits fabric rolls and other components of the collapsible display wall to be easily placed in or removed from the carrying case.

SUMMARY

In accordance with one aspect of the present invention, a carrying case assembly with detachable step stool includes a carrying case portion including one or more first side walls, the first side walls defining a first interior space and a first top opening. The assembly further includes a step stool portion including a top portion and one or more second side walls, the second side walls defining a second interior space and a bottom opening. Means are provided for attaching the step stool portion to the carrying case portion such that the first and the second interior spaces, together, form a third interior space. The step stool portion is removable from the carrying case portion and is adapted to support a person thereon.

In accordance with another aspect of the present invention, a portable display assembly includes a framework assembly, the framework assembly being adapted to be erected into a self supporting, upright wall, the framework assembly being adapted to be collapsed into one or more bundles. Cover material is provided for covering the framework assembly in an erected condition, the cover material being removable from the framework and being adapted to be rolled into a roll. A carrying case assembly with a detachable step stool is also provided. The carrying case assembly includes a carrying case portion including one or more first side walls, the first side walls defining a first interior space and a first top opening. The carrying case assembly also includes a step stool portion including a top portion and one or more second side walls, the second side walls defining a second interior space and a bottom opening. Means are provided for locking the step stool portion to the carrying case portion such that the first and the second interior spaces, together, form a third interior space, the third interior space being of sufficient size to store the bundles for forming the framework and the roll of covering material. The step stool portion is removable from the carrying case portion and is adapted to support a person thereon.

BRIEF DESCRIPTION OF THE DRAWINGS

The features and advantages of the present invention are well understood by reading the following detailed description in conjunction with the drawings in which like numerals indicate similar elements and in which:

FIG. 2 is a front side view of a carrying case according to an embodiment of the present invention;

FIG. 3 is a right side view of a carrying case according to an embodiment of the present invention;

FIG. 4 is a rear side view of a carrying case according to an embodiment of the present invention;

FIG. 7 is a top view of a step stool portion of a carrying case according to an embodiment of the present invention in which the lid is opened;

FIG. 8 is a bottom view of a step stool portion of a carrying case according to an embodiment of the present invention;

FIG 10 is a bottom view of a carrying case according to an embodiment of the present invention;

FIGS. 14A–14C are perspective, top, and exploded perspective views of a lighting case according to an embodiment of the invention.

DETAILED DESCRIPTION

Figure 1:
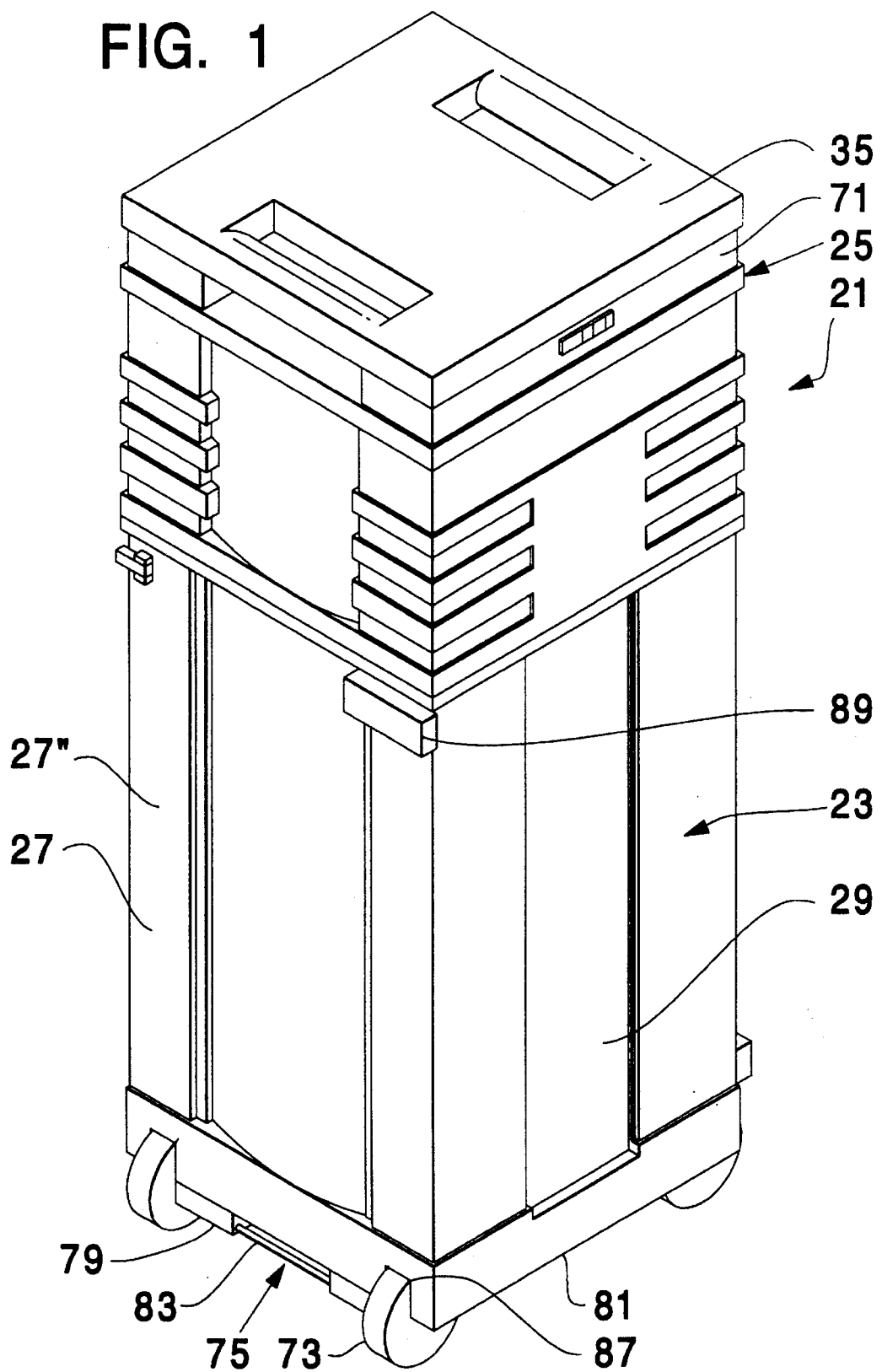
FIG. 1 is a perspective view of a carrying case according to an embodiment of the present invention.
Figure 5:
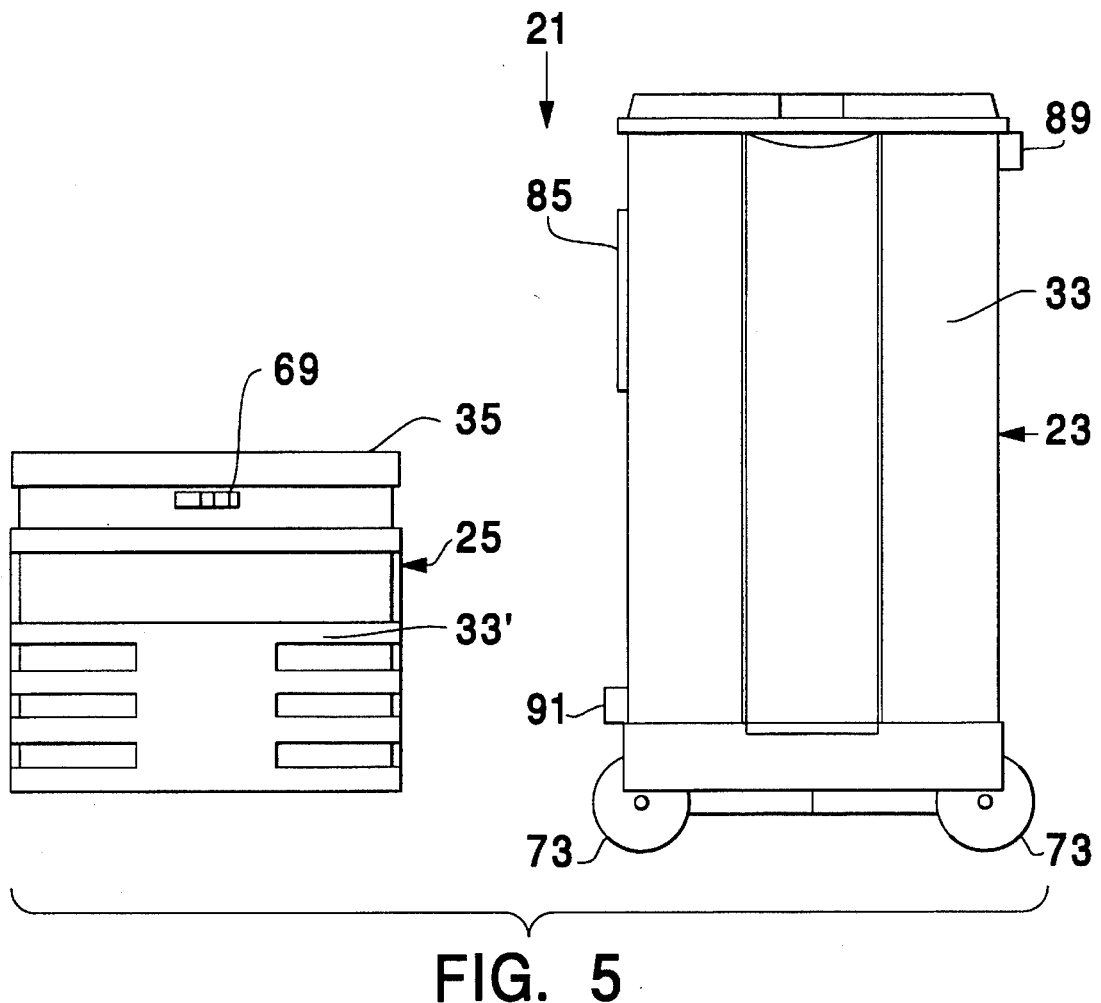
FIG. 5 is a left side view of a carrying case according to an embodiment of the present invention, showing the step stool portion of the carrying case removed from the bottom portion.

A carrying case 21 according to a preferred embodiment of the present invention is seen in FIG. 1. The carrying case 21 includes a lower case portion 23 attachable to an upper step stool portion 25. The carrying case is preferably substantially square or rectangular and has a front side 27 (FIG. 2), a right side 29 (FIG. 3), a rear side 31 (FIG. 4), and a left side 33 (FIG. 5). The overall dimensions of the carrying case are preferably no larger than the overall dimensions allowable for shipment by common delivery services. The presently preferred overall dimensions of the carrying case are approximately 16 in. (41 cm.) wide by approximately 16 in. (41 cm.) deep by approximately 41.5 in. (105 cm.) high.

Figure 6:
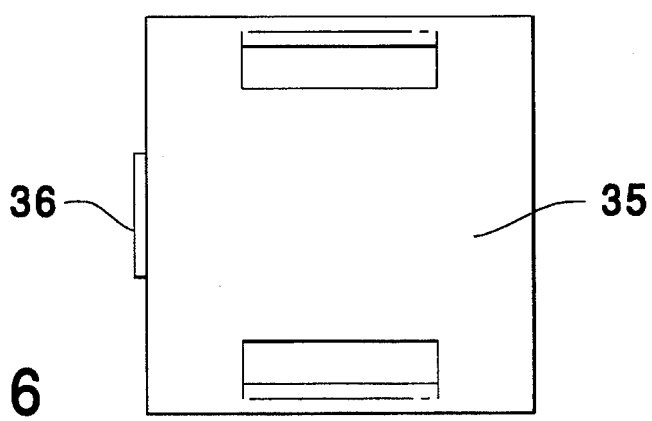
FIG. 6 is a top view of a step stool portion of a carrying case according to an embodiment of the present invention.

As seen in FIG. 5, the step stool portion 25 is removable from the case portion 23 to serve as a step stool useful for such purposes as adjusting lights and display graphics on conventional collapsible display walls such as the display wall disclosed in U.S. Pat. Nos. 4,512,097, 4,800,663, and 4,970,841, and U.S. patent application Ser. No. 08/088,897, the disclosures of which are hereby incorporated by reference. As seen in FIGS. 6 and 7, the step stool 25 preferably includes a substantially flat-topped lid 35 attached by a hinge arrangement 36 to the left side 33' of the step stool 25.

Figure 9:
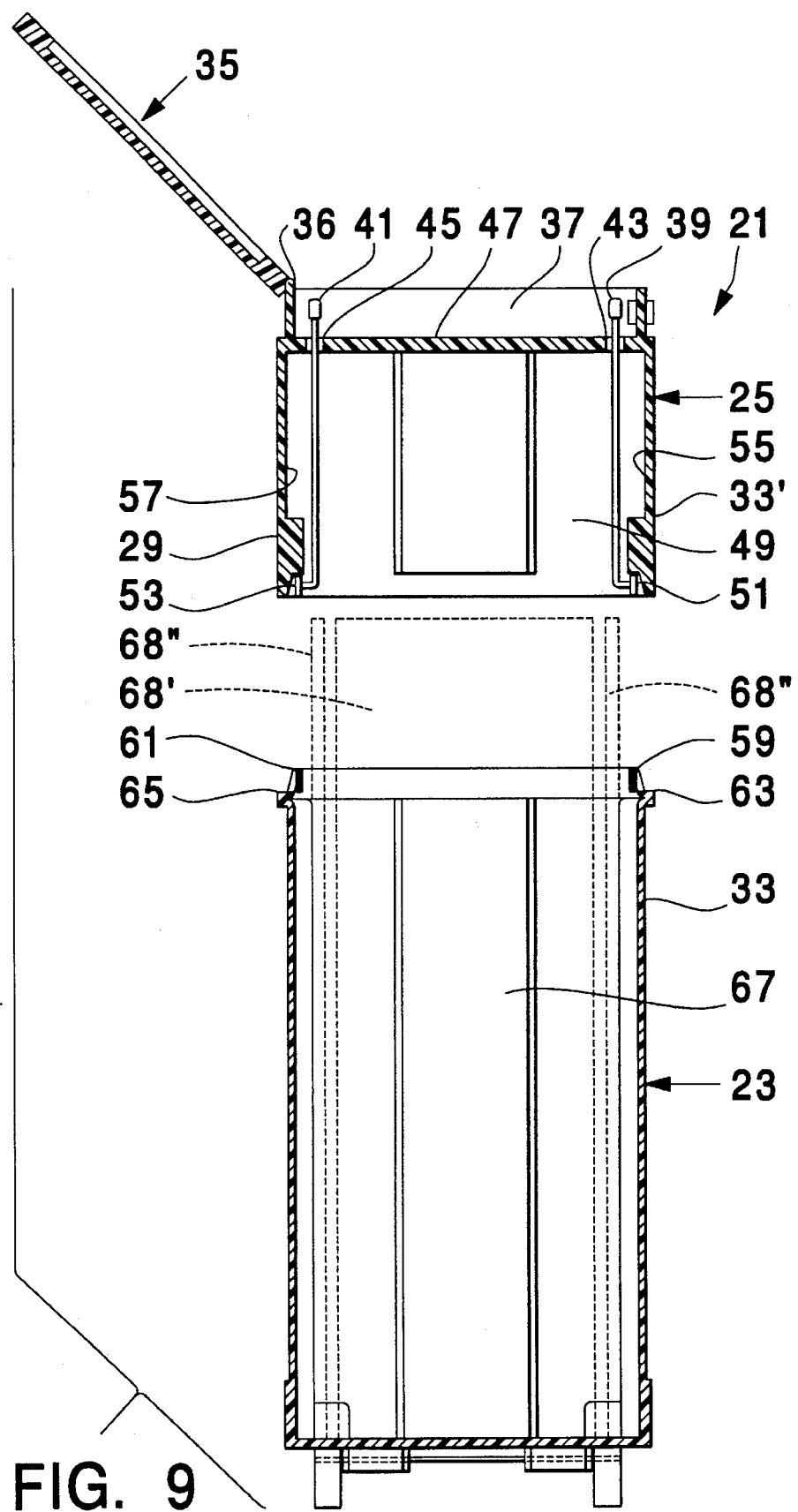
FIG. 9 is a cross-sectional view of a carrying case according to an embodiment of the present invention.

As seen in FIG. 7, the lid 35 covers a top cavity 37 of the step stool 25 into which a left and a right latch handle 39 and 41 extend through left and right slots 43 and 45 through a bottom wall 47 of the top cavity from a lower cavity 49 of the step stool, seen in FIG. 8. Left and right latch portions 51 and 53 are attached to inner left and right walls 55 and 57 of the lower cavity 49 for latching with corresponding left and right latch portions 59 and 61 attached to upper left and right edges 63 and 65 of walls defining a cavity 67 in the case portion 23, as seen in FIG. 9, to secure the case portion and the step stool portion 25 together. A lock 69 is preferably provided on the step stool 25 to lock the lid 35 in a closed position over the top cavity 37. A latch (not shown) may also be provided on the lid 35 for keeping the lid closed in situations where it may not be desired to lock the lid.

The step stool 25 is capable of safely supporting the weight of a person, and conforms with all applicable regulations pertinent to step stools. Overhanging corners of the lid 35 are reinforced with corner blocks 71 to prevent flexing of the lid. Except for hardware such as the above-mentioned latches and locks, the step stool 25, including the lid 35, is, like the case portion 23, preferably formed from a sturdy plastic material, preferably by a molding process. The step stool portion 25 is preferably approximately 13.25 in. (34 cm.) high, which is understood to be a sufficient height for a person standing on the step stool portion to comfortably reach the top of an eight foot high display wall. The step stool portion 25 may, of course, be any desired height, subject to limitations imposed by the above-mentioned regulations.

As seen in FIG. 10, the case portion 23 is preferably provided with wheels 73 mounted on axles 75 extending through holes 77 provided in ribs 79 on the bottom wall 81 of the case portion. The wheels 73 facilitate easy maneuvering of the carrying case 21. A portion 83 of at least one of the axles 75 is preferably exposed to serve as a handle for carrying the carrying case 21 horizontally, such as when it is necessary to move the carrying case down a flight of stairs. A collapsible handle 85, as seen, for example, in FIGS. 3 and 4, is preferably provided on the rear side 31" of the case portion 23 to further facilitate carrying the carrying case horizontally, or for pulling the carrying case in its normal vertical condition. Additional handles (not shown) may also be provided on other sides of the carrying case 21. The wheels 73 are preferably partially disposed in recesses 87 in the bottom wall 81 to minimize the overall dimensions of the carrying case, however, if desired, other types of wheels, such as caster-type wheels adapted to pivot, may be provided.

A latch 89 is preferably provided on the upper front side 27" of the case portion 23, near the right side 29, and a latch 91 is preferably provided on the lower rear side 31" of the case portion, near the right side. A hasp 90 is preferably provided on the upper front side 27" of the case portion 23, near the left side 33, and a hasp 92 is preferably provided on the lower rear side 31" of the case portion, near the left side. The latches 89 and 91 mate with or hitch onto hasps 90 and 92 on other ones of the carrying cases and facilitate maneuvering multiple ones of the carrying cases together.

Figure 11:
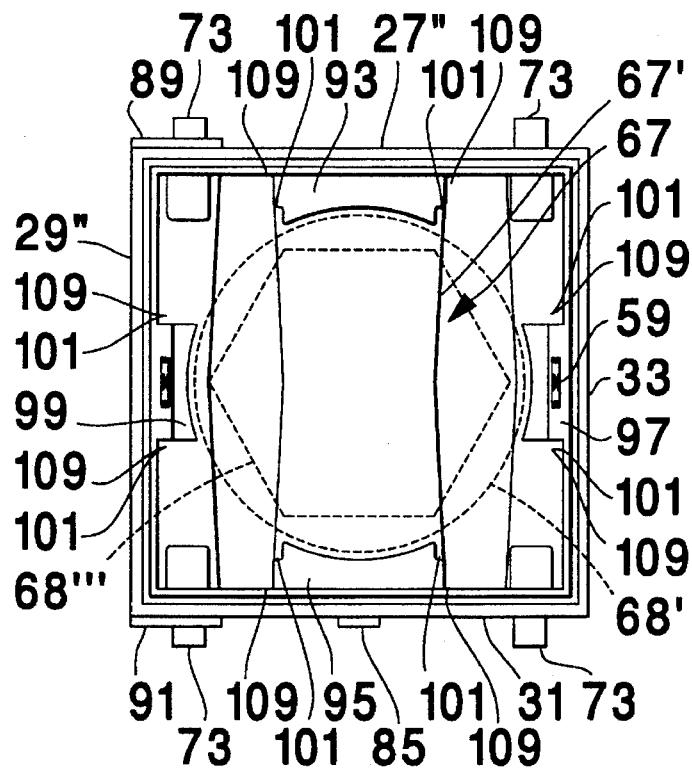
FIG. 11 is a top view of a bottom portion of a carrying case according to an embodiment of the present invention.

When the step stool portion 25 and the case portion 23 are attached to one another, the lower cavity 49 of the step stool portion and the cavity 67 of the case portion, together, define a cavity of sufficient size to contain a roll 68' of fabric (usually a carpet-like fabric) for covering a collapsible framework, as well as several bundles 68" of collapsed framework, as seen in FIG. 9. As seen in FIG. 11, the cavity 67 of the case portion 23 preferably includes a front and a rear arc-shaped wall portion 93 and 95. Left and right wall portions 97 and 99 are also provided below the left and right latch portions 59 and 61 and are preferably rounded near the bottom wall 81 of the case portion 23 and become substantially straight near the upper left and right edges 63 and 65, respectively.

The front and rear wall portions 93 and 95 and the left and right wall portions 97 and 99 define a substantially circular central cavity 67' of the cavity 67 for receiving a roll 68' of fabric material for covering a collapsible display wall. The substantially circular shape of the central cavity 67' facilitates maintaining the shape of the roll 68' of fabric and keeping the roll in position during transport, as the roll will generally unravel to fill the allowable space.

Figure 12A:
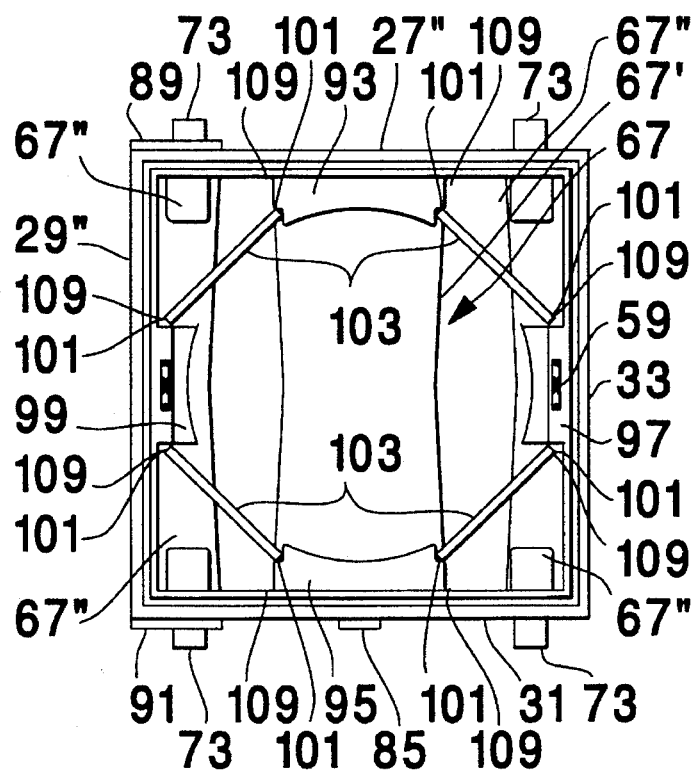
FIGS. 12A, 12B, and 12C are top views of a bottom portion of a carrying case according to an embodiment of the present invention including panels defining vertical cavities in the carrying case.

As seen, for example, in FIG. 12A, the front and rear wall portions 93 and 95 and the left and right wall portions 97 and 99 further preferably define four substantially triangular corner cavities 67". Vertical grooves 101 are defined by the front and rear wall portions 93 and 95 and the left and right wall portions 97 and 99 for receiving panels 103, seen in FIGS. 12A and 12C, for isolating the triangular corner cavities 67" from the central cavity 67'. The panels 103 further define the substantially circular shape of the central cavity 67' and further facilitate maintaining the fabric roll 68' in position and maintaining the shape of the roll.

Moreover, the isolated corner cavities 67" provide spaces in the carrying case 21 for containing bundles 68" of collapsed framework in such a manner that damage to the fabric roll 68' by the framework during transport is avoided. Accordingly, where, ordinarily, three packages may be necessary to safely ship a collapsible display wall, two for framework bundles and other hardware having a total weight in excess of the total weight permitted for a single package, and one for the fabric roll, it is possible, with the carrying case 21 according to the present invention, to distribute the weight of the framework bundles and hardware between two packages and place the fabric roll or rolls in one or both packages. A fabric roll 68' packed in the same carrying case 21 with bundles 68" of framework is shown in FIG. 9.

The lower cavity 49 of the step stool portion 25 is preferably also provided with arced front and rear wall portions 105 and 107. The front and rear wall portions 105 and 107 preferably define a larger diameter circular space than the front and rear wall portions 93 and 95. The larger diameter circular space simplifies the "blind" placement of the lower cavity 49 of the step stool portion 25 over a fabric roll in the central cavity 67', as the fabric roll will have approximately the diameter of the central cavity and will, therefore, be somewhat smaller in diameter than the lower cavity of the step stool portion.

Figure 12B:
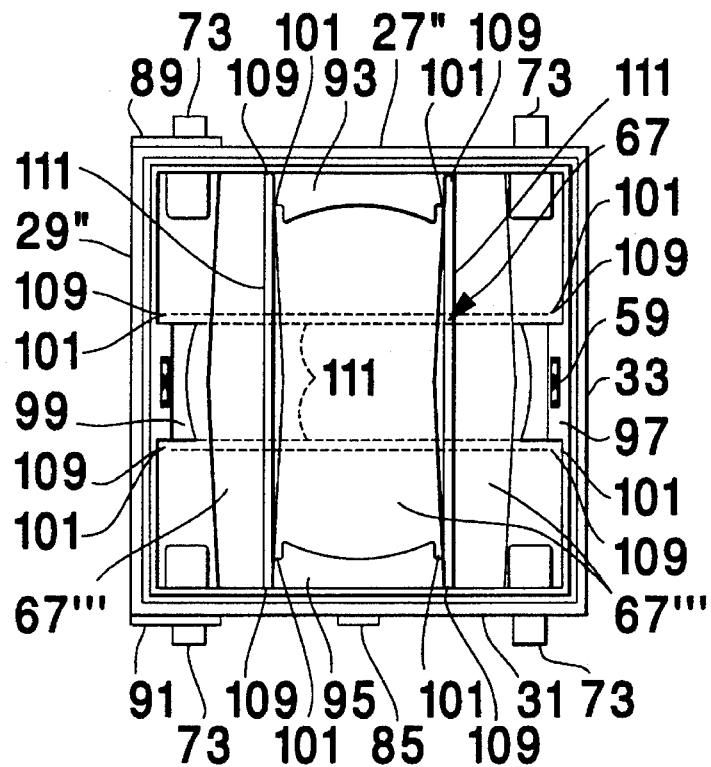
Figure 12C:
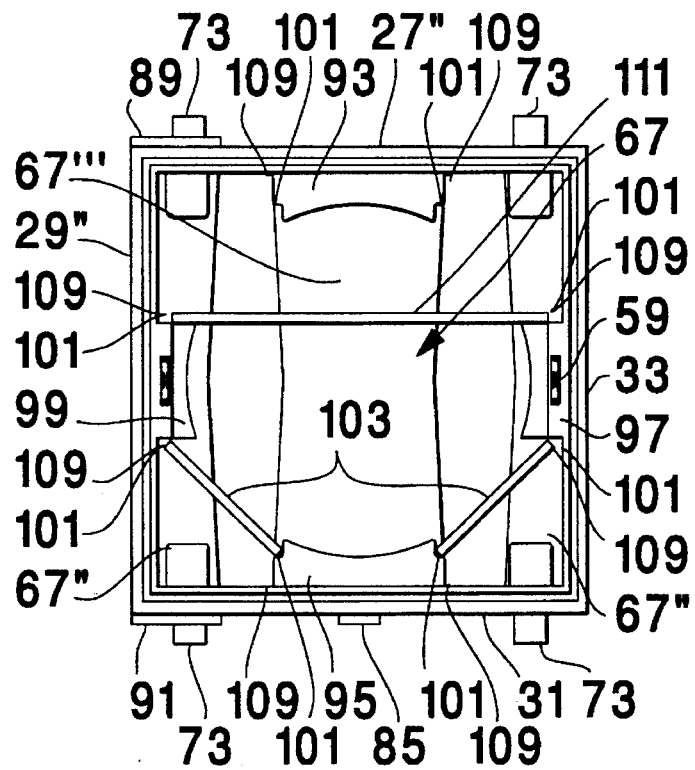

One or more pairs of vertical grooves 109 for receiving opposite edges of one or more shelf panels 111, seen in FIGS. 12B and 12C, are preferably also defined by the front and rear wall portions 93 an 95 and by the left and right wall portions 97 and 99 to define substantially rectangular cavities 67'''. The rectangular cavities or spaces 67''' are preferably larger than the corner spaces 67" and are useful for packing equipment such as signs and framework elements that do not conveniently fit in the corner spaces. As seen in FIG. 12C, at least some of the vertical grooves preferably function both as the vertical grooves 101 for receiving the divider panels 103 and as the vertical grooves 109 for receiving the shelf panels 111.

The case portion 23 is preferably approximately 30.25 in. (77 cm.) high. By providing the carrying case 21 with a detachable step stool portion 25 having an interior cavity 49 for receiving equipment attached to such a case portion 23, also having an interior cavity 67, a case having a large total interior volume for packing large amounts of equipment is provided. Further, the provision of a case portion 23 having a relatively low top facilitates easy access to the top of the case portion by persons of various heights for purposes of putting a fabric roll or other equipment into or taking the fabric roll or other equipment out of the cavity 67 in the case portion.

The carrying case 21 may be provided in any desired shape, such as a cylindrical case. However, for purposes of shipping, a substantially box-shaped carrying case is preferred. The box shape reduces the tendency of the carrying case to roll around and permits a larger interior volume for the same height, width, and depth dimensions of a cylindrical case.

While the carrying case 21 has thus far been described in connection with the relatively specific application of carrying a collapsible display wall, it will be understood that the carrying case is useful for carrying a wide variety of equipment. The panels 103 or shelf panels 111 may be used to divide up the interior volume of the carrying case 21 to isolate any number of items from one another. Further, the carrying case 21 may be used without the panels 103 or shelf panels 111 to provide a single, large volume for carrying larger equipment. Upon detaching the step stool portion 25 from the case portion 23, access to the interior of the case portion is easily gained by persons of almost all heights. Further, the step stool portion 25 is useful as a step stool for many other applications other than adjusting equipment at the top of a display wall.

Figure 13:
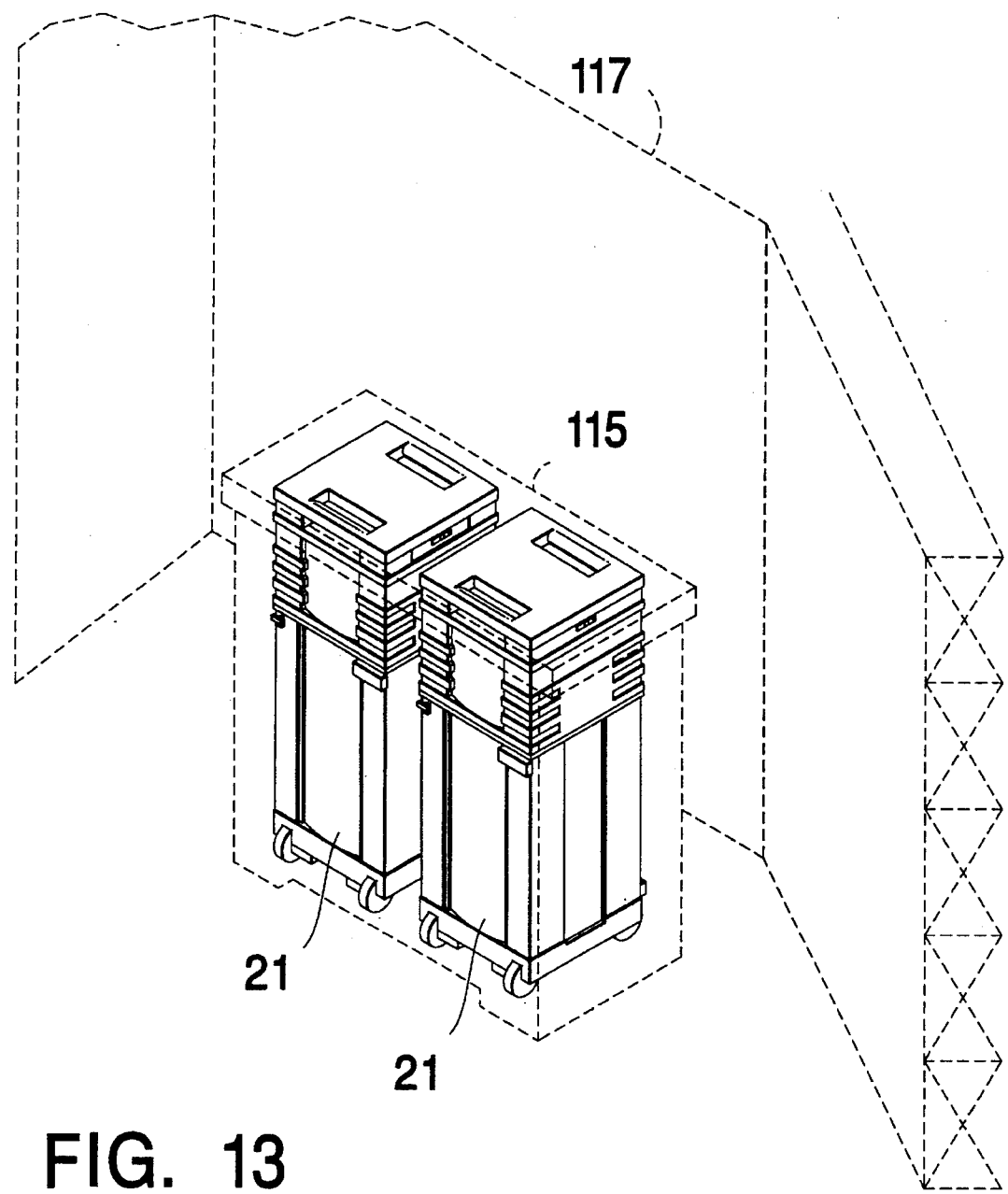
FIG. 13 is a perspective view of a pair of carrying cases concealed by a counter assembly and arranged in front of a collapsible display wall.

As seen in FIG. 13, the carrying case 21 is further useful as a work surface, i.e., a table, or as a support for a counter assembly 115. The carrying case 21 is particularly useful in connection with a counter assembly such as is disclosed in U.S. patent application Ser. No. 08/198,774 now U.S. Pat. No. 5,402,733 and U.S. Design patent application Ser. No. 29/018,983, both filed concurrently with the present application, the disclosures of both of which are hereby incorporated by reference. In accordance with a preferred embodiment, two adjacent carrying cases 21 and 21 form a pedestal over which the counter assembly 115 is formed. The counter assembly conceals the carrying cases 21 and 21 and provides an attractive work station to complement a display wall 117. The counter assembly 115 may be packed in the carrying cases 21 and 21 along with the collapsible display wall 117. In addition to providing the attractive workstation, use of the carrying cases 21 and 21 to support the counter assembly 115 avoids the need to have drayage remove the carrying cases after the display wall 117 has been erected.

As noted above, the carrying case 21 is useful for carrying equipment other than or in addition to components of a collapsible display wall. As seen, for example, in FIG. 11, the cavity 67 is preferably adapted to receive the lighting case 68''', seen in FIGS. 14A–14C. As seen in FIG. 11, the lighting case 68''' may, for example, be received in a space defined by a fabric roll 68'. The lighting case 68''' may also, of course, be shipped in the carrying case 21 by itself.

As seen in FIGS. 14A–14C, the lighting case 68''' includes a first and a second half 119 and 121. The first and second halves 119 and 121 preferably each include a central wall 123 and 125, respectively. The central walls 123 and 125 each include a series of ribs 127 defining recesses 129 for receiving ribs on the opposite one of the central walls. The first and second halves 119 and 121 are preferably attached to one another by several patches of hook 131 and pile 133 fastener material provided on the central walls 123 and 125.

The lighting case 68''' is preferably hexagonal when assembled. Holes 135 and 137 are preferably provided in upper regions of the central walls 123 and 125 for forming a carrying handle when the lighting case 68''' is assembled.

Panels 139, which are preferably removable, define six substantially triangular vertical spaces 141 for separate packing of equipment 143 such as lighting equipment. The panels 139 preferably slope downwardly from the outside of the lighting case 68''' to the central walls 123 and 125 to facilitate use of the handle formed by the holes 135 and 137. The panels 139 are preferably held in position inside the lighting case 68''' by interior corners 145 of the hexagonal case on one edge 147 of the panels and by another edge 149 of another panel on the opposite edge of the panels.

The lighting case 68''' is preferably manufactured from a single, trapezoidal member (not shown) having the general shape of the first and second halves 119 and 121. The trapezoidal member is cut, usually in half, to form the trapezoidal first and second halves. The trapezoidal member may be provided with ribs, such as by being molded with ribs, prior to being cut to form the halves, or the ribs may be applied after cutting the trapezoidal member. In this manner, it is possible to manufacture the lighting case 68''' as a molded member through the use of a single mold.

While this invention has been illustrated and described in accordance with a preferred embodiment, it is recognized that variations and changes may be made therein without departing from the invention as set forth in the claims.

What is claimed is:

1. A carrying case assembly having a detachable step stool, comprising:

a carrying case portion including one or more first side walls, the first side walls defining a first interior space and a first top opening;

a step stool portion including a top portion and one or more second side walls, the second side walls defining a second interior space and a bottom opening;

means for attaching the step stool portion to the carrying case portion such that the first and the second interior spaces, together, form a third interior space;

the step stool portion being removable from the carrying case portion and being adapted to support a person thereon; and one or more removable panels for defining vertical spaces in the first interior space, an interior surface of the first side walls being formed with one or more pairs of vertical grooves for receiving opposite edge portions of the panels.

2. The carrying case assembly having a detachable step stool as set forth in claim 1, wherein the attaching means includes one or more latch assemblies, each latch assembly including a first portion attached to the carrying case portion and a movable second portion attached to the step stool portion, the first and second latch assembly portions being engageable and disengageable when the second latch assembly portions are moved.

3. The carrying case assembly having a detachable step stool as set forth in claim 1, wherein the attaching means includes one or more latch assemblies, each latch assembly including a first portion attached to the carrying case portion and a second portion attached to the step stool portion, the first and second latch assembly portions being engageable and disengageable.

4. The carrying case assembly having a detachable step stool as set forth in claim 1, wherein the first interior space is defined by four substantially perpendicular first side walls, adjacent ones of the four first side walls defining four first corners, the grooves including four pairs of divider grooves for receiving opposite edges of four divider panels, each pair of divider grooves including a first divider groove on one of each of the side walls and a second divider groove on an adjacent one of each of the side walls, the four divider panels and the four first side walls defining four substantially triangular vertical spaces and one substantially circular vertical space.

5. The carrying case assembly having a detachable step stool as set forth in claim 4, wherein the second interior space defines a larger horizontal area than the substantially circular vertical space.

6. The carrying case assembly having a detachable step stool as set forth in claim 4, wherein the grooves include at least one pair of shelf grooves for receiving opposite edges of a corresponding shelf panel, each pair of shelf grooves including a first shelf groove on one side wall and a second shelf groove on an opposite one of the side walls, the shelf panel being adapted to divide the interior space into two rectangular spaces.

7. The carrying case assembly having a detachable step stool as set forth in claim 6, wherein the four pairs of divider grooves are formed such that shelf panels are adapted to be received in pairs of the divider grooves on opposite walls and divider panels are adapted to be received in pairs of the divider grooves on adjacent walls.

8. The carrying case assembly having a detachable step stool as set forth in claim 1, wherein the first interior space is defined by four substantially perpendicular first side walls, the grooves including four pairs of shelf grooves for receiving opposite edges of one or more shelf panels, each pair of shelf grooves including a first shelf groove on one of each of the side walls and a second shelf groove on an opposite one of each of the side walls, the shelf panels and the four first side walls defining two or more substantially rectangular vertical spaces.

9. The carrying case assembly having a detachable step stool as set forth in claim 1, further comprising means for hitching the carrying case assembly having a detachable step stool to another, identical carrying case assembly having a detachable step stool.

10. The carrying case assembly having a detachable step stool as set forth in claim 1, further comprising means for rolling the carrying case.

11. The carrying case assembly having a detachable step stool as set forth in claim 1, further comprising a handle provided on an exterior surface of the first side walls.

12. A carrying case assembly having a detachable step stool, comprising:

a carrying case portion including one or more first side walls, the first side walls defining a first interior space and a first top opening;

a step stool portion including a top portion and one or more second side walls, the second side walls defining a second interior space and a bottom opening;

means for attaching the step stool portion to the carrying case portion such that the first and the second interior spaces, together, form a third interior space; and the step stool portion being removable from the carrying case portion and being adapted to support a person thereon, wherein the top portion of the step stool portion is in the form of a lid movably disposed at a second top edge of the second side walls, the lid being movable relative to the step stool portion between an open and a closed position, the lid portion covering a second top opening in the closed position, and the attaching means includes one or more latch assemblies, each latch assembly including a first portion attached to the carrying case portion and a movable second portion attached to the step stool portion, the first and second latch assembly portions being engageable and disengageable when the second latch assembly portions are moved, movable upper portions of the second latch assembly portions for moving the second latch assembly portions to engage and disengage with the first latch assembly portions being disposed in the second interior space, access to the second latch assembly portions being obtained by moving the lid portion to the open, position.

13. The carrying case assembly having a detachable step stool as set forth in claim 12, wherein the lid portion is pivotably attached to the step stool portion.

14. A carrying case assembly having a detachable step stool, comprising:

a carrying case portion including one or more first side walls, the first side walls defining a first interior space and a first top opening;

a step stool portion including a top portion and one or more second side walls, the second side walls defining a second interior space and a bottom opening;

means for attaching the step stool portion to the casing case portion such that the first and the second interior spaces, together, form a third interior space;

the step stool portion being removable from the carrying case portion and being adapted to support a person thereon;

the top portion of the step stool portion being in the form of a lid movably disposed at a second top edge of the second side walls, the lid being movable relative to the step stool portion between an open and a closed position, the lid portion covering a second top opening in the closed position; and a lock for locking the lid portion in the closed position relative to the step stool portion.

15. The carrying case assembly having a detachable step stool as set forth in claim 14, further comprising a dividing wall in the step stool portion, the dividing wall, the second side walls, and the lid portion defining a cavity, and the dividing wall defining an upper end of the second interior space.

16. The carrying case assembly having a detachable step stool as set forth in claim 14, further comprising one or more removable panels for defining vertical spaces in the first interior space, an interior surface of the first side walls being formed with one or more pairs of vertical grooves for receiving opposite edge portions of the panels.

17. The carrying case assembly having a detachable step stool as set forth in claim 14, further comprising means for hitching the carrying case assembly having a detachable step stool to another, identical carrying case assembly having a detachable step stool.

18. A portable display assembly, comprising:

a framework assembly, the framework assembly being adapted to be erected into an upright wall, the framework assembly being adapted to be collapsed into one or more bundles;

cover material for covering the framework assembly in an erected condition, the cover material being removable from the framework assembly and being adapted to be rolled into a roll;

a carrying case assembly having a detachable step stool including
a carrying case portion including a bottom wall and one or more first side walls, the first side walls defining a first interior space and a first top opening,
a step stool portion including a top portion and one or more second side walls, the second side walls defining a second interior space and a bottom opening,
means for locking the step stool portion to the carrying case portion such that the first and the second interior space, together, form a third interior space, the third interior space being of sufficient size to store the bundles for forming the framework assembly and the roll of cover material, and
the step stool portion being removable from the carrying case portion and being adapted to support a person thereon.

19. The portable display assembly as set forth in claim 18, wherein the step stool portion is sufficiently high to permit a person supported thereon to reach to a top portion of the framework in the erected condition.

20. The portable display assembly as set forth in claim 18, further comprising a collapsible counter assembly, the collapsible counter assembly, in a collapsed condition, being adapted to be received in a carrying case, the collapsible counter assembly, in an erected condition, being adapted to be placed around and supported by the carrying case, the erected collapsible counter assembly concealing the carrying case.

21. The portable display assembly as set forth in claim 18, further comprising a lighting case adapted to be received in the third interior space.

22. The portable display assembly as set forth in claim 18, wherein the carrying case assembly further includes one or more removable panels for defining vertical spaces in the first interior space, an interior surface of the first side walls being formed with pairs of vertical grooves for receiving opposite edge portions of the panels.

23. The portable display assembly as set forth in claim 22, wherein the panels and wall portions of the carrying case assembly define a substantially circular vertical space, and the second interior space defines a larger horizontal area than the substantially circular vertical space and a portion of the elongated roll of covering material extends upwardly out of the substantially circular vertical space and is receivable in the second interior space.

* * * * *